(No Model.)
G. W. & P. C. TOTMAN.
ELECTRIC BELT.
No. 377,218. Patented Jan. 31, 1888.
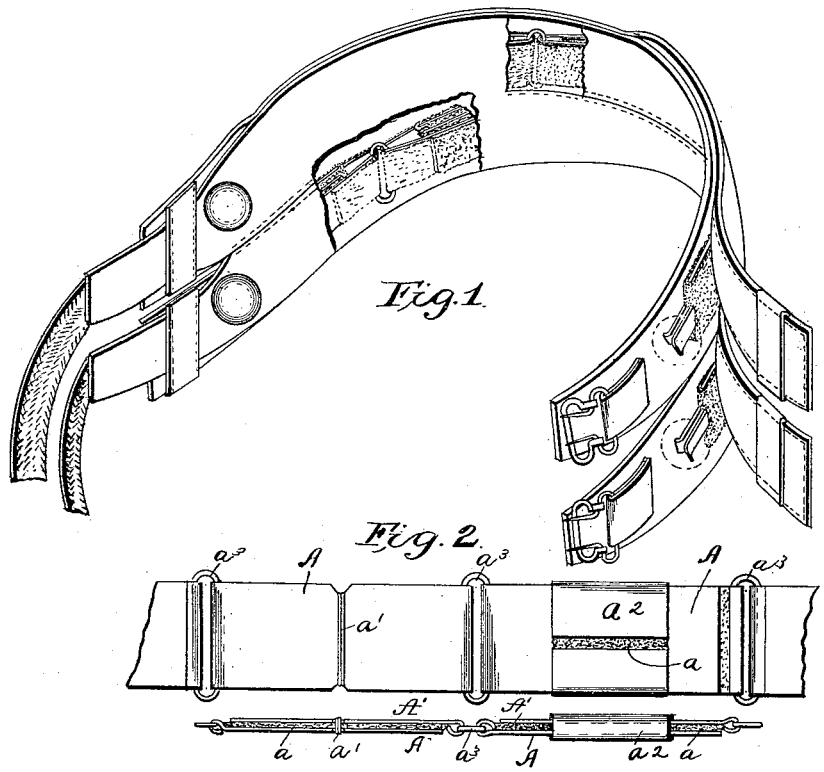
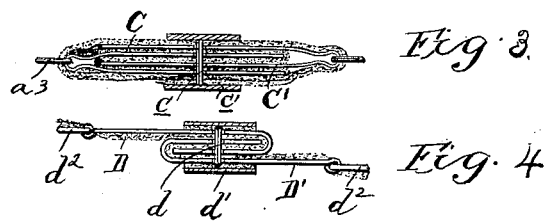
Witnesses
R. C. Laurie
Van Buren Hillyard.
Inventors
George W. Totman
Perry C. Totman
By his Attorneys
R. S. & A. P. Lacey
N. PETERS, Photo-Lithographer, Washington, D. C.

United States Patent Office.

GEORGE W. TOTMAN AND PERRY C. TOTMAN, OF CASSADAGA, NEW YORK.

ELECTRIC BELT.

SPECIFICATION forming part of Letters Patent No. 377,218, dated January 31, 1888.

Application filed June 18, 1887. Serial No. 241,790. (No model.)

*To all whom it may concern:*

Be it known that we, GEORGE W. TOTMAN and PERRY C. TOTMAN, citizens of the United States, residing at Cassadaga, in the county of Chautauqua and State of New York, have invented certain new and useful Improvements in Electric Belts; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of electric body-wear which in its organization comprises links or cells made of plates of opposite polarity bound together with an absorbent insulating medium between them and coupled together in series, forming a battery-chain which is inclosed in a suitable case provided with means for securing it to the person.

The object of the invention is the production of a simple and efficient means for securing the links or plates composing the cells together in a convenient, economical, and expeditious manner.

The improvement consists in having the links or plates of the cells bound together by a non-conducting strand, and having such binder protected by a strap or short length of metallic ribbon wrapped about said plates. The binder is seated in corresponding notches in the edges of the links or plates, and provides a positive means for holding the links or plates against lateral or longitudinal displacement, and the ribbon or strap serves as an additional binder and shields and prevents any wriggling movement of the links or plates which would have a tendency to cut through the binder.

The improvement further consists in the novel features of construction and combination of parts, which will be more fully hereinafter set forth, claimed, and shown in the annexed drawings, in which—

Figure 1 is a perspective view, parts being broken away, of a belt or battery chain embodying our invention; Fig. 2, a plan and edge view of a section of the battery-chain. Fig. 3 is a further modification. Fig. 4 is a still further modification.

The battery-chain is composed of a series of links or cells coupled together in such manner that the negative pole of one link or cell is coupled with the positive pole of the adjacent link or cell, and are held together by the non-conducting binder and the supplemental binder and shield. The edges of the links or plates of a cell are correspondingly notched, and the non-conducting binder is seated in said notches.

Fig. 2 shows a cell composed of two plates, A and A', of opposite polarity, placed alongside and opposite each other and insulated from each other by absorbent medium $a$. The edges of the two plates are correspondingly notched, and the binder $a'$—a non-electrical conductor—is wrapped around the plates and fitted in said notches. The plates are further held together by the supplemental binder $a^2$, composed of a short length of metallic ribbon or strap bent around the plates and over the binder $a'$, which is thereby shielded. To prevent short-circuiting the cell, an insulating medium is placed between the plates and the supplemental binder. The outer ends of the plates are curled, and are adapted to receive connections $a^3$, by which two or more of such cells are flexibly coupled together.

The plates C and C', composing the cell shown in Fig. 3, are approximately U-shaped, and the limb of one plate fits in the space between the limbs of the other plate, and are bound together by the binder $c$, fitted in notches in the edges of the plates, and the supplemental binder $c'$. The plates C and C' and the supplemental binder $c'$ are insulated from each other by suitable material.

Fig. 4 shows an arrangement somewhat similar to Fig. 3, except that the plates are separated into cells which are flexibly coupled together by the connections $d^2$. The plates D and D' have only one end folded, which folded ends are looped into each other and are held together by the binder $d$, seated in notches in the edges of the plates, and the supplemental binder $d'$. The outer ends of the plates are curled and receive the connections $d^2$. The plates and supplemental binders are insulated from each other.

A battery-chain formed as hereinbefore stated is suitably incased and the ends of the battery are electrically connected with plates or buttons at each end of the case in any of the well-known ways.

It is preferred to make the case double, or with two separate longitudinal pockets which receive separate battery-chains. If both batteries are not required, the case can be folded so that only one battery acts directly on the body, or conductors can be applied to the second battery and the current conveyed to different parts of the body requiring treatment.

Having thus described our invention, what we claim, and desire to secure by Letters Patent, is—

1. A battery-chain for electric body wear, composed of links or cells coupled together in series, the links of opposite polarity or the plates of the cells being held together by a non-conducting binder of electricity, and a supplemental metallic binder embracing and forming a shield for the said binder, the metallic parts being suitably insulated, substantially as and for the purpose described.

2. In electric body wear, the combination, with two plates of opposite polarity having notches in their edges, of the non-conducting binder of electricity fitted in the notches, the supplemental metallic binder fitting over the non-conducting binder, and the insulation interposed between the plates and the supplemental binder, substantially as and for the purpose described.

In testimony whereof we affix our signatures in presence of two witnesses.

GEORGE W. TOTMAN.
PERRY C. TOTMAN.

Witnesses:
ELI L. SLOUGH,
HENRY HARDY.